(12) United States Patent
Hanyu (10) Patent No.: US 8,111,482 B2
(45) Date of Patent: Feb. 7, 2012

(54) HEAD ASSEMBLY, HEAD SUSPENSION ASSEMBLY, AND DISK DEVICE PROVIDED WITH HEAD ASSEMBLY

(75) Inventor: Mitsunobu Hanyu, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 904 days.

(21) Appl. No.: 12/140,826

(22) Filed: Jun. 17, 2008

(65) Prior Publication Data

US 2009/0002891 A1    Jan. 1, 2009

(30) Foreign Application Priority Data

Jun. 29, 2007  (JP) ................................. 2007-173046

(51) Int. Cl.
    *G11B 5/60* (2006.01)
(52) U.S. Cl. ................................. 360/236.3; 360/235.7
(58) Field of Classification Search ............... 360/235.5,
    360/235.6, 235.7, 235.8, 235.9, 236, 236.1,
    360/236.2, 236.3
See application file for complete search history.

(56) References Cited

U.S. PATENT DOCUMENTS

| | | | | |
|---|---|---|---|---|
| 5,940,249 | A * | 8/1999 | Hendriks | 360/235.6 |
| 6,021,020 | A | 2/2000 | Itoh et al. | |
| 6,483,667 | B1 * | 11/2002 | Berg et al. | 360/235.6 |
| 6,809,904 | B2 * | 10/2004 | Boutaghou et al. | 360/235.8 |
| 7,099,114 | B2 * | 8/2006 | Kang | 360/235.6 |
| 7,463,452 | B2 * | 12/2008 | Takahashi et al. | 360/235.8 |
| 7,505,228 | B2 * | 3/2009 | Hanyu | 360/235.6 |
| 7,643,251 | B1 * | 1/2010 | Zhang et al. | 360/235.6 |
| 7,656,616 | B2 * | 2/2010 | Matsumoto | 360/235.7 |
| 7,719,794 | B2 * | 5/2010 | Hanyu et al. | 360/235.6 |
| 7,903,375 | B2 * | 3/2011 | Knigge et al. | 360/235.7 |
| 7,961,432 | B2 * | 6/2011 | Hanyu | 360/236.3 |
| 7,969,685 | B2 * | 6/2011 | Shen et al. | 360/125.31 |
| 2002/0008940 | A1 * | 1/2002 | Jang et al. | 360/236.3 |
| 2002/0063995 | A1 * | 5/2002 | Sannino et al. | 360/236.3 |
| 2002/0075600 | A1 * | 6/2002 | Schnur et al. | 360/235.8 |
| 2007/0058296 | A1 | 3/2007 | Hashimoto et al. | |
| 2007/0121238 | A1 * | 5/2007 | Kondo et al. | 360/69 |
| 2007/0188925 | A1 * | 8/2007 | Ishihara | 360/235.8 |

FOREIGN PATENT DOCUMENTS

| | | |
|---|---|---|
| JP | 10-283622 | 10/1998 |
| JP | 2000-353370 | 12/2000 |
| JP | 2001-331917 | 11/2001 |
| JP | 2007-073165 | 3/2007 |

* cited by examiner

*Primary Examiner* — Brian Miller
(74) *Attorney, Agent, or Firm* — Pillsbury Winthrop Shaw Pittman, LLP (57) ABSTRACT

According to one embodiment, a slider of a head includes a trailing step portion which protrudes from a facing surface of the slider, is situated on the downstream side of a negative-pressure cavity with respect to an airflow, and has a top surface, a trailing pad which protrudes from the top surface, and an adjustment recess which is formed in the top surface on the upstream side of the trailing pad with respect to the airflow and is shallower than the negative-pressure cavity. The adjustment recess defines a first step portion, which extends across a first direction and hangs from the top surface toward a bottom of the adjustment recess, and a second step portion, which extends across the first direction, is spaced in the first direction from the first step portion, and rises from the bottom of the adjustment recess toward the top surface.

7 Claims, 9 Drawing Sheets

Slider of comparative example

Generated positive pressure distribution of comparative example
(inner periphery)

FIG. 10A

Generated positive pressure distribution of embodiment
(inner periphery)

FIG. 10B

Generated negative pressure distribution of comparative example
(outer periphery)

FIG. 11A

Generated negative pressure distribution of embodiment
(outer periphery)

HEAD ASSEMBLY, HEAD SUSPENSION ASSEMBLY, AND DISK DEVICE PROVIDED WITH HEAD ASSEMBLY

CROSS-REFERENCE TO RELATED APPLICATIONS

This application is based upon and claims the benefit of priority from Japanese Patent Application No. 2007-173046, filed Jun. 29, 2007, the entire contents of which are incorporated herein by reference.

BACKGROUND

1. Field

One embodiment of the invention relates to a head assembly used in a disk device such as a magnetic disk device, a head suspension assembly provided with the head assembly, and a disk device provided with the head suspension assembly.

2. Description of the Related Art

A disk device, e.g., a magnetic disk device, includes a magnetic disk, spindle motor, magnetic head assembly, and carriage assembly. The magnetic disk is disposed in a case. The spindle motor supports and rotates the disk. The magnetic head assembly writes and reads information to and from the disk. The carriage assembly supports the magnetic head assembly for movement with respect to the magnetic disk. The carriage assembly includes a rotatably supported arm and a suspension extending from the arm. The magnetic head assembly is supported on an extended end of the suspension. The head assembly includes a slider attached to the suspension and a head portion on the slider. The head portion is constructed including a reproducing element for reading and a recording element for writing.

The slider has a facing surface that is opposed to a recording surface of the magnetic disk. A predetermined head load directed to a magnetic recording layer of the disk is applied to the slider by the suspension. When the magnetic disk device operates, an airflow is generated between the disk in rotation and the slider. Based on the principle of aerodynamic lubrication, a force (positive pressure) to fly the slider above the recording surface of the disk acts on the facing surface of the slider. By balancing this flying force with the head load, the slider is flown with a given gap above the recording surface of the disk.

The flying height of the slider is expected to be substantially fixed without regard to the radial position of the magnetic disk. The rotational speed of the disk is constant, while its peripheral speed varies depending on the radial position. More specifically, the peripheral speed is low on the inner peripheral side of the disk and high on the outer peripheral side. At the inner peripheral portion of the disk, therefore, an air film force of the airflow that is generated between the disk surface and the slider and the flying height of the slider are small, and the slider is so susceptible to the influence of disturbance that the flying height fluctuates easily. At the outer peripheral portion of the disk, on the other hand, the air film force of the airflow that is generated between the disk surface and the slider is so great that the flying height of the slider is liable to increase.

Proposed in Jpn. Pat. Appln. KOKAI Publication No. 10-283622, for example, is a disk device in which a negative-pressure cavity or a dynamic pressure generating groove is formed near the center of a facing surface or an air bearing surface (ABS) of a slider in order to prevent such fluctuations of the flying height. Further proposed in Jpn. Pat. Appln. KOKAI Publication No. 2007-73165, for example, is a device in which a trailing pad on a facing surface of a slider is provided with a bearing surface.

In general, the surface of a magnetic disk on the inner peripheral side is formed rougher than that on the outer peripheral side. If the flying height of a magnetic head assembly is small on the inner peripheral side of the disk, therefore, the head assembly contacts the rugged disk surface, so that the disk and its surface may possibly be damaged. Thus, it is advisable to increase the flying height of the magnetic head assembly on the inner peripheral side of the magnetic disk.

With the magnetic head assembly of the disk devices described above, however, the flying height on the outer peripheral side of the magnetic disk inevitably increases in proportion to an increase, if any, in that on the inner peripheral side of the disk. Thus, it is difficult to improve the recording accuracy and density of the magnetic disk as a whole.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided a head assembly comprising: a slider which has a facing surface opposed to a surface of a rotatable recording medium and is flown by an airflow which is generated between the recording medium surface and the facing surface as the recording medium rotates; and a head portion which is disposed on the slider and records and reproduces information to and from the recording medium, the facing surface of the slider having a first direction along the airflow and a second direction perpendicular to the first direction, the slider including a negative-pressure cavity which is defined by a recess formed in the facing surface and generates a negative pressure, a leading step portion which protrudes from the facing surface and is situated on the upstream side of the negative-pressure cavity with respect to the airflow, a pair of sidestep portions which individually protrude from the facing surface, extend from the leading step portion toward a downstream end of the slider in the first direction, and are opposed to each other with a space therebetween in the second direction, a trailing step portion which protrudes from the facing surface, is situated on the downstream side of the negative-pressure cavity with respect to the airflow, and has a top surface opposed to the recording medium, a trailing pad which protrudes from the top surface of the trailing step portion, and an adjustment recess which is formed in the top surface of the trailing step portion on the upstream side of the trailing pad with respect to the airflow and is shallower than the negative-pressure cavity, the adjustment recess forming a first step portion, which extends across the first direction and hangs from the top surface of the trailing step portion toward a bottom of the adjustment recess, and a second step portion, which extends across the first direction, is spaced in the first direction from the first step portion, and rises from the bottom of the adjustment recess toward the top surface of the trailing step portion.

An embodiment in which a disk device according to this invention is applied to a hard disk drive (HDD) will now be described in detail with reference to the accompanying drawings.

Figure 1:
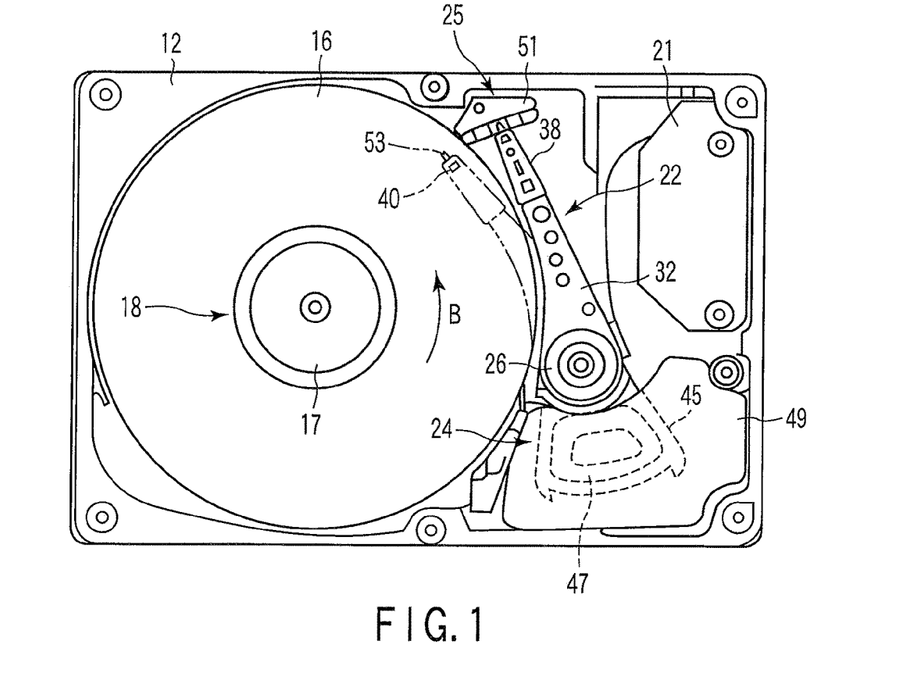
FIG. 1 is an exemplary plan view showing an HDD according to an embodiment of the invention.

As shown in FIG. 1, the HDD includes a case 12 in the form of an open-topped rectangular box and a top cover (not shown). The top cover is fastened to the case by screws so as to close the top opening of the case.

The case 12 contains a magnetic disk 16, spindle motor 18, magnetic head assemblies 40, carriage assembly 22, voice coil motor (VCM) 24, ramp load mechanism 25, board unit 21, etc. The magnetic disk 16 serves as a recording medium. The spindle motor 18 serves as a drive section that supports and rotates the disk. The magnetic heads write and read information to and from the disk. The carriage assembly 22 supports the heads for movement with respect to the disk 16. The VCM 24 rotates and positions the carriage assembly. The ramp load mechanism 25 holds the magnetic heads in a retracted position at a distance from the magnetic disk when the heads are moved to the outermost periphery of the disk. The board unit 21 includes a head IC and the like.

A printed circuit board (not shown) is screwed to the outer surface of a bottom wall of the case 12. The circuit board controls the operations of the spindle motor 18, VCM 24, and magnetic head assemblies through the board unit 21.

The magnetic disk 16 has magnetic recording layers on its upper and lower surfaces, individually. The disk 16 is fitted on a hub (not shown) of the spindle motor 18 and fixed on the hub by a clamp spring 17. If the motor 18 is driven, the disk 16 is rotated at a predetermined speed of, for example, 4,200 rpm in the direction of arrow B.

The carriage assembly 22 is provided with a bearing portion 26, which is fixed on the bottom wall of the case 12, and arms 32 that extend from the bearing portion. The arms 32 are situated parallel to the surfaces of the magnetic disk 16 and spaced from one another. They extend in the same direction from the bearing portion 26. The carriage assembly 22 is provided with suspensions 38 that are elastically deformable elongated plates. Each suspension 38 is formed of a leaf spring, of which the proximal end is fixed to the distal end of its corresponding arm 32 by spot welding or adhesive bonding and which extends from the arm. Alternatively, each suspension may be formed integrally with its corresponding arm 32. The arm 32 and the suspension 38 constitute a head suspension, and the head suspension and the magnetic heads assemblies 40 constitute a head suspension assembly.

Figure 2:
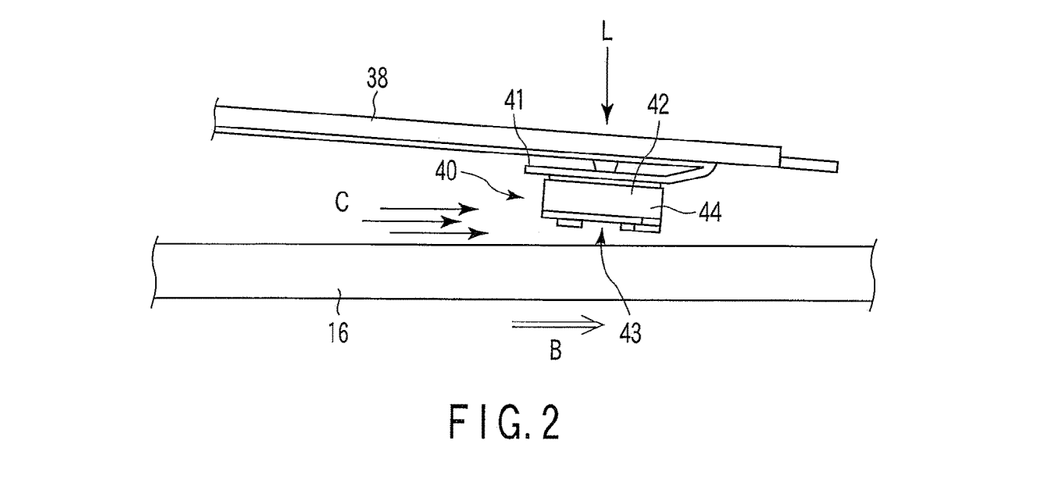
FIG. 2 is an exemplary enlarged side view showing a magnetic head portion of the HDD.

As shown in FIG. 2, each magnetic head assembly 40 includes a slider 42 substantially in the shape of a rectangular parallelepiped and a recording/reproducing head portion 44 on the slider. It is fixed to a gimbal spring 41 that is provided on the distal end portion of each suspension 38. Each magnetic head assembly 40 is subjected to a head load L that is directed to a surface of the magnetic disk 16 by the elasticity of the suspension 38.

As shown in FIG. 1, the carriage assembly 22 includes a support frame 45 that extends from the bearing portion 26 oppositely from the arms 32. The support frame supports a voice coil 47 that constitutes a part of the VCM 24. The support frame 45 is molded from plastic and formed integrally on the outer periphery of the voice coil 47. The voice coil 47 is situated between a pair of yokes 49 that are fixed on the case 12 and, in conjunction with these yokes and a magnet (not shown) fixed to one of the yokes, constitutes the VCM 24. If the voice coil 47 is energized, the carriage assembly 22 rotates around the bearing portion 26, whereupon each magnetic head assembly 40 is moved to and positioned in a region over a desired track of the magnetic disk 16.

The ramp load mechanism 25 includes a ramp 51 and tabs 53. The ramp 51 is provided on the bottom wall of the case 12 and located outside the magnetic disk 16. The tabs 53 extend individually from the respective distal ends of the suspensions 38. As the carriage assembly 22 rotates to its retracted position outside the magnetic disk 16, each tab 53 engages with a ramp surface on the ramp 51 and is then pulled up along the slope of the ramp surface, whereupon each magnetic head is unloaded.

Figure 3:
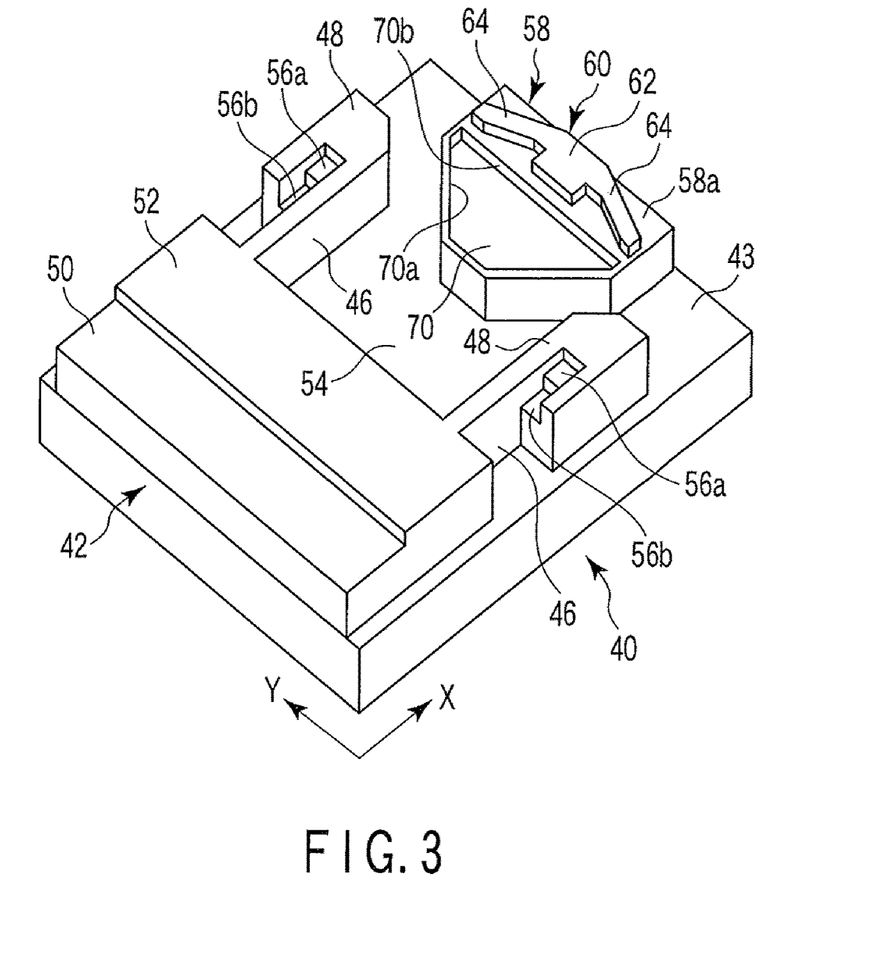
FIG. 3 is an exemplary perspective view showing the disk-facing surface side of a slider of the magnetic head.

The following is a detailed description of each magnetic head 40. FIG. 3 is a perspective view showing the slider of the magnetic head, FIG. 4 is a plan view of the slider, and FIG. 5 is a sectional view of the slider.

Figure 4:
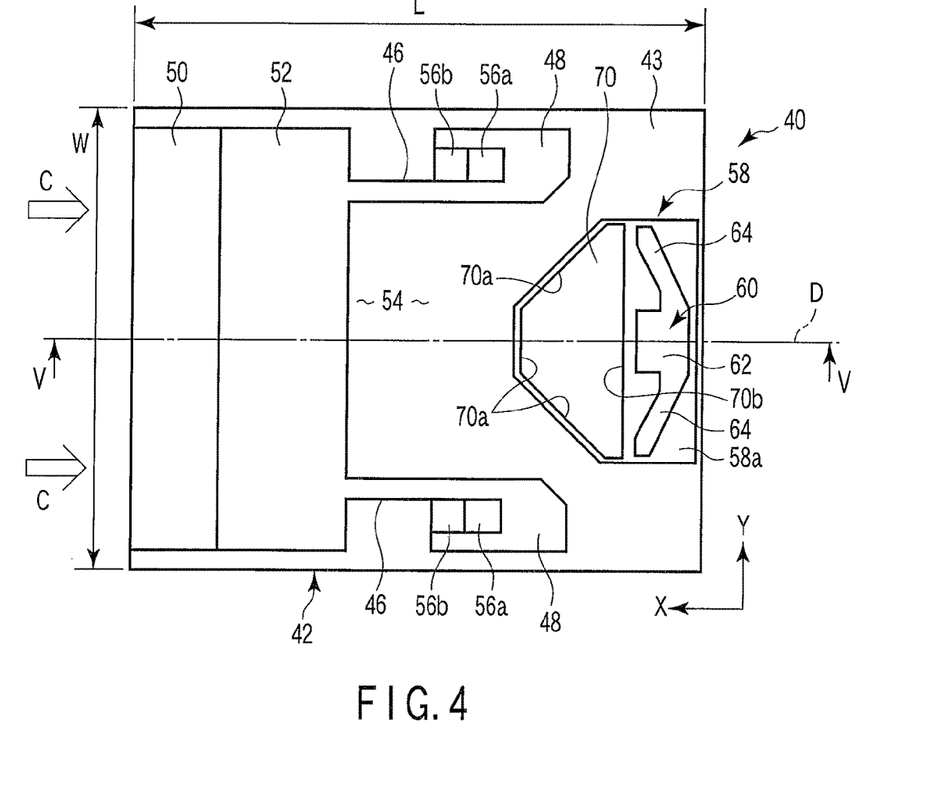
FIG. 4 is an exemplary plan view showing the disk-facing surface side of the slider.
Figure 5:
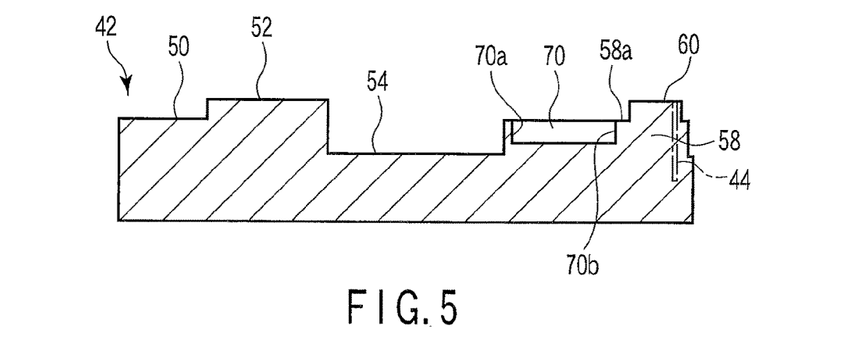
FIG. 5 is an exemplary sectional view taken along line V-V of FIG. 4.

As shown in FIGS. 3 to 5, the magnetic head assembly 40 includes the slider 42 that is substantially in the shape of a rectangular parallelepiped. The slider has a rectangular disk-facing surface (air bearing surface (ABS)) 43, which faces a surface of the magnetic disk 16. The longitudinal direction of the disk-facing surface 43 is supposed to be a first direction X, and the transverse direction perpendicular thereto to be a second direction Y. The surface 43 has a central axis D that extends in the first direction X.

The slider 42 is formed as a so-called femto slider, having a length L of 1.25 mm or less, e.g., 0.85 mm, in the first direction X and a width W of 1.0 mm or less, e.g., 0.7 mm, in the second direction Y.

The magnetic head assembly 40 is constructed as a flying head, in which the slider 42 is flown by an airflow C (see FIG.

2) that is generated between the disk surface and the disk-facing surface 43 as the magnetic disk 16 rotates. When the HDD is operating, the disk-facing surface 43 of the slider 42 never fails to be opposed to the disk surface with a gap therebetween. The direction of the airflow C is coincident with the direction of rotation B of the magnetic disk 16. The slider 42 is located so that the first direction X of the disk-facing surface 43 opposed to the surface of the disk 16 is substantially coincident with the direction of the airflow C.

A substantially rectangular leading step portion 50 protrudes from the disk-facing surface 43 so as to face the magnetic disk surface. The leading step portion 50 is formed covering the upstream-side end portion of the disk-facing surface 43 with respect to the airflow C. A pair of sidestep portions 46 protrude from the disk-facing surface 43. They extend along the long sides of the surface 43 and are opposed to each other with a space between them. The sidestep portions 46 extend from the leading step portion 50 toward the downstream end of the slider 42. The leading step portion 50 and the pair of sidestep portions 46 are located symmetrically with respect to the central axis D of the slider 42. As a whole, they are formed substantially in the shape of a U, closed on the upstream side and open to the downstream side.

In order to maintain the pitch angle of the magnetic head assembly 40, a leading pad 52 that utilizes an air film to support the slider 42 protrudes from the leading step portion 50. The leading pad 52 continuously extends throughout the area that covers the width of the leading step portion 50 in the second direction Y, and is formed in a position deviated on the downstream side from the inflow-side end of the slider 42.

A side pad 48 is formed on each sidestep portion 46 and leads to the leading pad 52. The pads 52 and 48 are formed substantially flat and face the magnetic disk surface.

A first recess 56a and a second recess 56b are continuously formed in each side pad 48. The first and second recesses 56a and 56b open toward the inflow-side end of the disk-facing surface 43 as well as toward the magnetic disk surface. Each of the recesses 56a and 56b has a rectangular shape, which is defined by a pair of side edges, which extend substantially parallel to the first direction X, and a bottom edge, which connects the respective extended ends of the side edges and extends substantially parallel to the second direction Y.

As shown in FIGS. 3 and 4, a negative-pressure cavity 54 is formed substantially in the center of the disk-facing surface 43. It is a recess that is defined by the pair of sidestep portions 46 and the leading step portion 50. The cavity 54 is formed on the downstream side of the leading step portion 50 with respect to the airflow C and opens toward the downstream side. The negative-pressure cavity 54 serves to generate a negative pressure on the central part of the disk-facing surface 43 at every feasible yaw angle for the HDD.

The slider 42 has a trailing step portion 58 that protrudes from the downstream end portion of the disk-facing surface 43 with respect to the airflow C. The trailing step portion 58 is situated on the downstream side of the negative-pressure cavity 54 with respect to the airflow C and substantially in the center of the disk-facing surface 43 with respect to the second direction Y.

As shown in FIGS. 3 to 5, the trailing step portion 58 is substantially in the shape of a rectangular parallelepiped, of which two corner portions on the upstream side are chamfered. The height of projection (or depth) of the trailing step portion 58 is equal to that of the leading step portion 50. The trailing step portion 58 has a top surface 58a that faces the magnetic disk surface.

A trailing pad 60 that utilizes an air film to support the slider 42 protrudes from the top surface 58a of the trailing step portion 58. The trailing pad 60 is formed a little higher than the top surface 58a of the trailing step portion 58 and flush with the leading pad 52 and the side pads 48.

The trailing pad 60 includes a substantially rectangular base portion 62 and a pair of wing portions 64 that extend from the base portion to opposite sides in the second direction Y. On the trailing step portion 58, the base portion 62 is provided on the central axis D on the outflow end side and situated substantially in the center with respect to the second direction Y. Each wing portion 64 extends in the second direction Y from the base portion 62 and with a small inclination toward the upstream end of the slider 42.

An adjustment recess 70 is formed in the top surface 58a of the trailing step portion 58. It is situated on the upstream side of the trailing pad 60 with respect to the airflow C. The recess 70 is formed shallower than the negative-pressure cavity 54. A depth d of the recess 70 is given by 0<d≦500 (nm), for example. In the present embodiment, the adjustment recess 70 is formed symmetrically with respect to the central axis D of the slider 42.

The adjustment recess 70 has the shape of, for example, a trapezoid, and is formed along the peripheral edge of the upstream end portion of the top surface 58a of the trailing step portion 58. The recess 70 has a closed contour. Specifically, the recess 70 is situated within the top surface 58a of the trailing step portion 58 without opening to side surfaces of the step portion 58. The bottom surface of the adjustment recess 70 is flat, and the peripheral surface thereof rises substantially at right angles to the bottom surface.

A first step portion 70a and a second step portion 70b are defined by the adjustment recess 70 in the leading step portion 50. The first step portion 70a extends across the first direction X and hangs from the top surface 58a of the trailing step portion 58 toward the bottom of the recess 70 to counter the airflow C. In the present embodiment, the first step portion 70a is composed of three sides of the trapezoid adjustment recess 70 on the upstream side. The second step portion 70b extends across the first direction X and is spaced in the first direction from the first step portion, that is, situated on the downstream side of the first step portion. Further, the second step portion 70b rises from the bottom of the adjustment recess 70 toward the top surface 58a of the trailing step portion 58 to counter the airflow C.

The first step portion 70a is situated on the upstream side of the second step portion 70b with respect to the airflow C and generates a negative pressure corresponding to the airflow. The second step portion 70b is situated on the downstream side of the first step portion 70a with respect to the airflow C and generates a positive pressure corresponding to the airflow.

As shown in FIG. 5, the head portion 44 of the magnetic head assembly 40 includes a recording element and a reproducing element, which record and reproduce information to and from the magnetic disk 16. The reproducing and recording elements are embedded in the downstream end portion of the slider 42 with respect to the direction of the airflow C. The reproducing and recording elements have a read/write gap (not shown) that is defined in the trailing pad 60.

According to the HDD and the head suspension assembly constructed in this manner, the magnetic head assembly 40 is flown by the airflow C that is generated between the disk surface and the disk-facing surface 43 as the magnetic disk 16 rotates. When the HDD is operating, therefore, the disk-facing surface 43 of the slider 42 never fails to be opposed to the disk surface with a gap therebetween. As shown in FIG. 2, the magnetic head assembly 40 flies in an inclined posture such that the read/write gap of the head portion 44 is located closest to the disk surface.

Since the disk-facing surface 43 of the slider 42 is provided with the negative-pressure cavity 54, it can generate a negative pressure on the central part of the surface 43 at every feasible yaw angle for the HDD. Further, the adjustment recess 70 is formed in the trailing step portion 58 and defines the first and second step portions 70a and 70b. The first step portion 70a generates a negative pressure corresponding to the airflow C, while the second step portion 70b generates a positive pressure corresponding to the airflow. Thus, a fluctuation of the flying posture between the inner and outer peripheral portions of the magnetic disk 16 can be suppressed even if the peripheral speed of the inner peripheral portion of the magnetic disk is different from that of the outer peripheral portion. Further, the flying height of the head on the inner peripheral side of the disk can be increased without unduly increasing that on the outer peripheral side. Thus, there may be obtained the magnetic head of improved stability and reliability, the head suspension assembly provided with the head, and the disk device.

Figure 6:
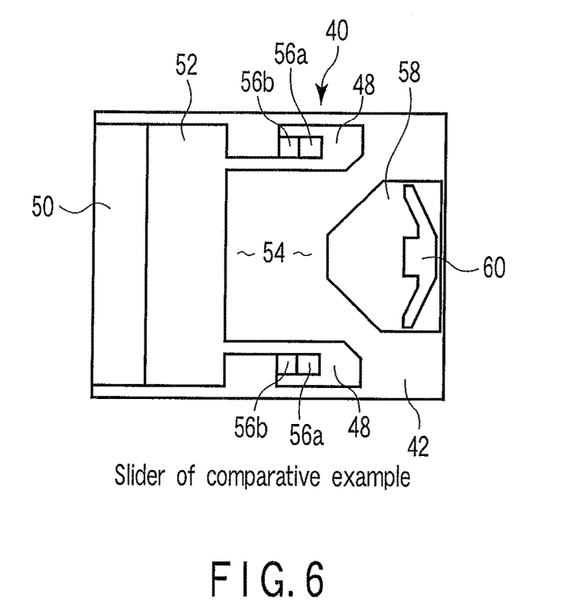
FIG. 6 is an exemplary plan view showing a slider of a magnetic head without a recess given as a comparative example.

The inventor hereof prepared the magnetic head according to the embodiment described above and a magnetic head according to a comparative example and simulated the flying heights of the respective sliders of these magnetic heads from the inner periphery to the outer periphery of the magnetic disk. In the magnetic head according to the comparative example, as shown in FIG. 6, a trailing step portion 58 of a slider 42 is a flat structure without the adjustment recess 70. Other configurations of this slider 42 are the same as those of the slider 42 according to the present embodiment.

Figure 7:
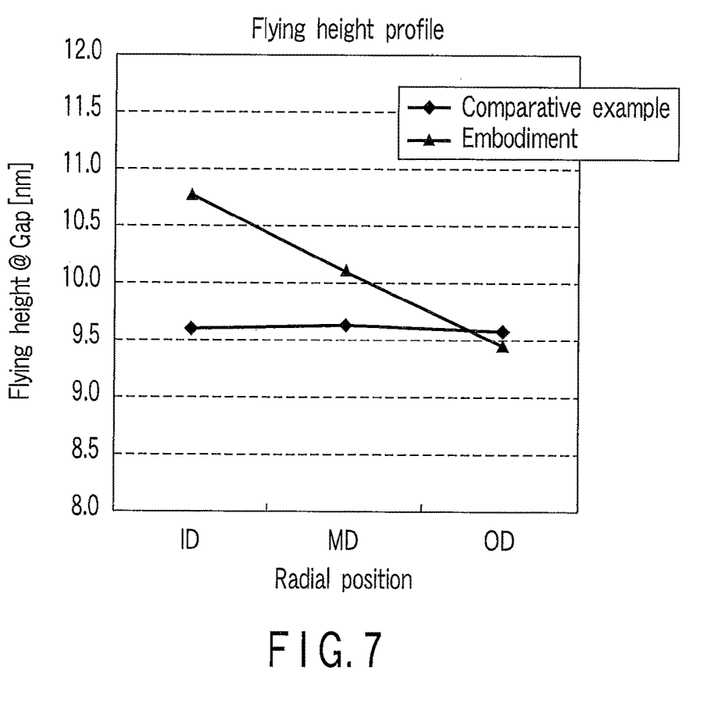
FIG. 7 is an exemplary diagram comparatively showing head flying heights with respect to the magnetic heads according to the present embodiment and the comparative example.
Figure 8A:
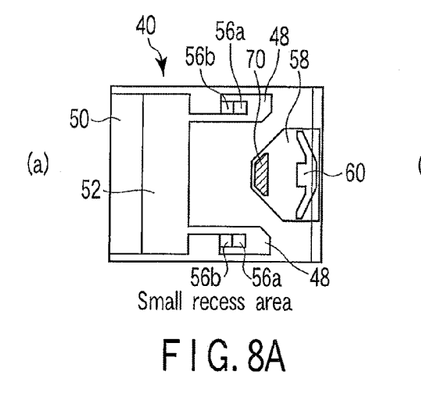
FIGS. 8A, 8B, 8C, 8D and 8E are exemplary plan views individually showing magnetic head sliders of five types that are different in the shape and number of recesses in a leading step portion.
Figure 8B:
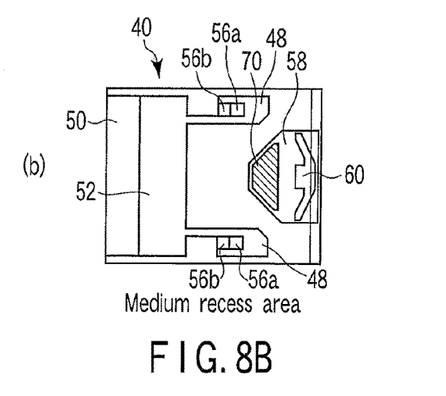
Figure 8C:
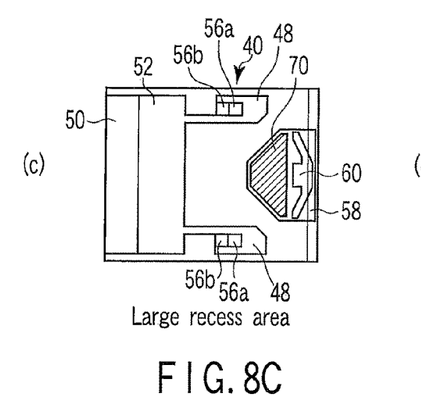
Figure 8D:
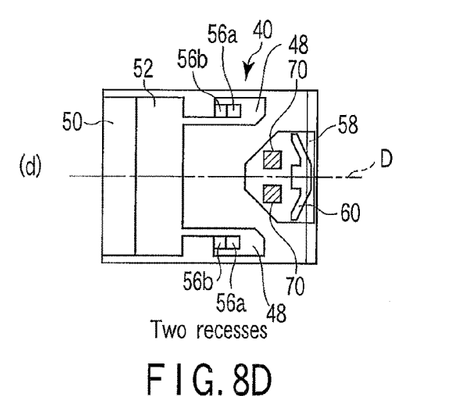
Figure 8E:
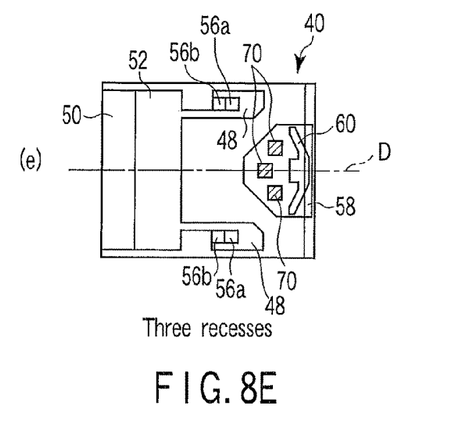

FIG. 7 shows the result of the simulation. Analysis conditions include a head load of 2.5 gf and peripheral speeds of 6.1, 9.2, and 12.2 m/s at the inner peripheral, middle, and outer peripheral portions, respectively, of the disk. In the magnetic head according to the comparative example, as shown in FIG. 7, flying heights in a position (ID) where the head faces the inner periphery of the magnetic disk, a position (MD) where the head faces the radially middle portion of the disk, and a position (OD) where the head faces the outer periphery of the disk are substantially fixed. According to the magnetic head of the present embodiment, on the other hand, its flying height in a position opposite the inner peripheral side of the disk where the peripheral speed is low is about 15% greater than that of the comparative example, and the flying height in a position opposite the outer peripheral side of the disk where the peripheral speed is high is substantially as great as that of the comparative example, as seen from FIG. 7.

Further, the inventor hereof prepared a plurality of magnetic heads having adjustment recesses 70 in their respective trailing step portions 58, the recesses being different in size and number. As shown in FIGS. 8A, 8B, 8C, 8D and 8E, for example, magnetic heads a, b, c, d and e of five different types were prepared and compared in their rates of flying height fluctuation between the inner and outer peripheral portions of the magnetic disk, based on the depth of each adjustment recess 70 as a parameter.

The magnetic heads a, b and c each have one trapezoid adjustment recess 70 formed in the trailing step portion 58. The recess 70 of the head a is the smallest of the three, and that of the head c is the largest. The magnetic head d has two rectangular recesses 70 individually formed in the trailing step portion 58, while the magnetic head e has three rectangular recesses 70 individually formed in the trailing step portion 58. Each recess 70 has an area smaller than that of the trailing step portion 58. Each side of the recess extends along the first or second direction X or Y. The individual sides of the recess 70 form first and second step portions that individually extend in the second direction Y and two other step portions that individually extend in the first direction X. Further, the two adjustment recesses 70 of the magnetic head d are located symmetrically with respect to the central axis D of the slider 42. Likewise, the three adjustment recesses 70 of the magnetic head e are located symmetrically with respect to the central axis D of the slider 42.

Other configurations of the magnetic heads a, b, c, d and e of five different types than the adjustment recess 70 are the same as those of the magnetic head according to the foregoing embodiment.

Figure 9:
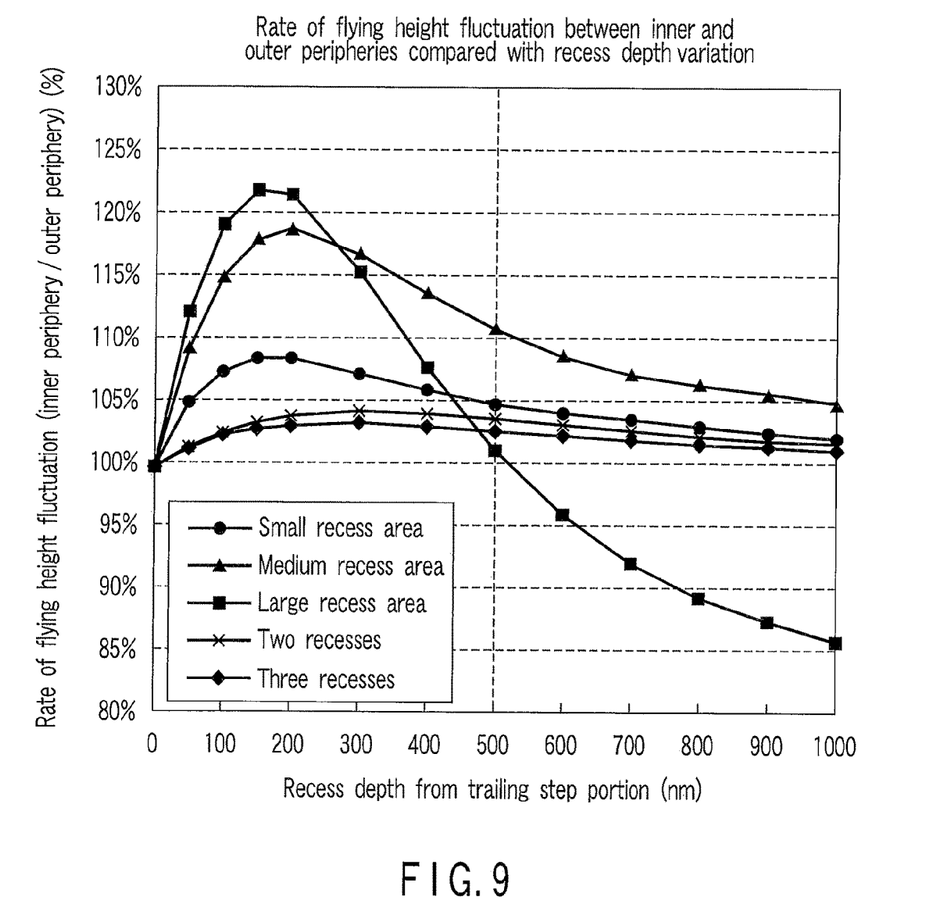
FIG. 9 is a diagram showing rates of flying height fluctuation of the magnetic heads with respect to the magnetic head sliders of five types, based on the depth of each recess as a parameter.

FIG. 9 shows rates of flying height fluctuation between the inner and outer peripheral portions of the magnetic disk, based on the depth of each adjustment recess 70. As shown in FIG. 9, the flying height of any of the magnetic heads at the outer peripheral portion of the disk can be restrained, and the head flying height at the inner peripheral portion of the disk is increased by providing the adjustment recesses 70 with depths up to about 500 nm without regard to the area, shape, and number of the adjustment recesses.

The following is a description of a mechanism capable of improving flying height profiles of the magnetic heads described above. In general, in the case of a head that is not based on any consideration of the peripheral speed or skew angle of the disk, the flying height of the slider is great on the outer peripheral side of the disk where the peripheral speed is so high that a positive pressure is easily generated. On the other hand, the flying height is inevitably low on the inner peripheral side of the disk where the peripheral speed is too low to generate a positive pressure with ease. In many HDDs, however, the flying height characteristics of the heads require contradictory behaviors. In the present embodiment, therefore, the trailing step portion is provided with the adjustment recess that acts as a pressurization portion to assist generation of a positive pressure on the trailing pad on the inner peripheral side of the disk where the peripheral speed is low and serves to increase generation of a negative pressure, thereby suppressing an increase in the flying height, on the outer peripheral side of the disk where the peripheral speed is high.

Figure 10A:
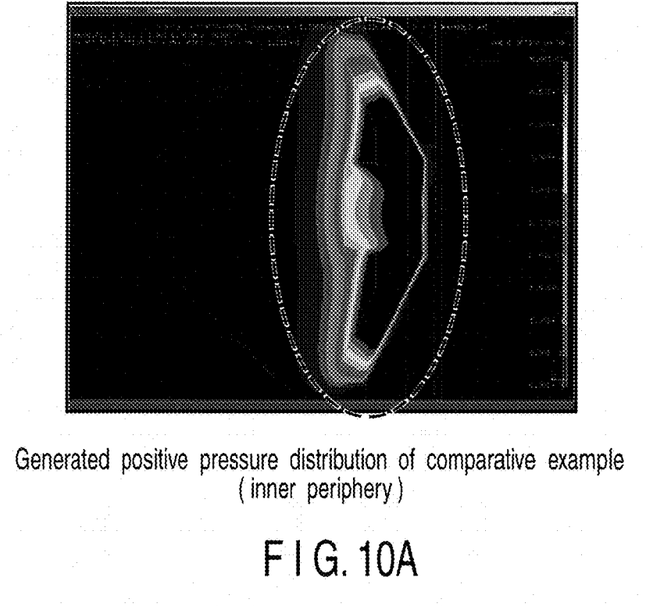
FIGS. 10A and 10B are exemplary diagrams individually showing positive pressure distributions at the inner peripheral portion of the disk with respect to the magnetic heads according to the present embodiment and the comparative example.
Figure 10B:
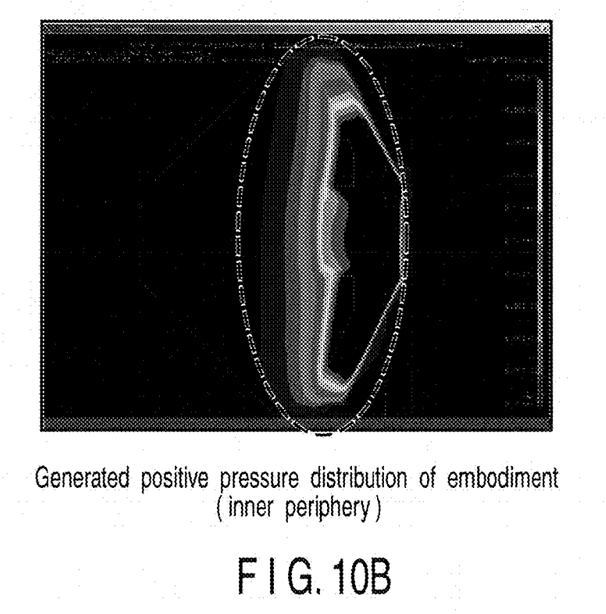
Figure 11A:
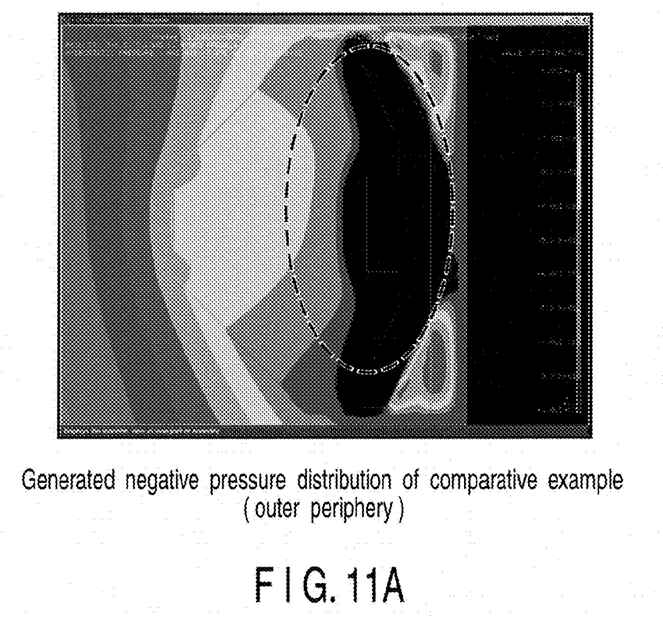
FIGS. 11A and 11B are exemplary diagrams individually showing negative pressure distributions at the outer peripheral portion of the disk with respect to the magnetic heads according to the present embodiment and the comparative example.
Figure 11B:
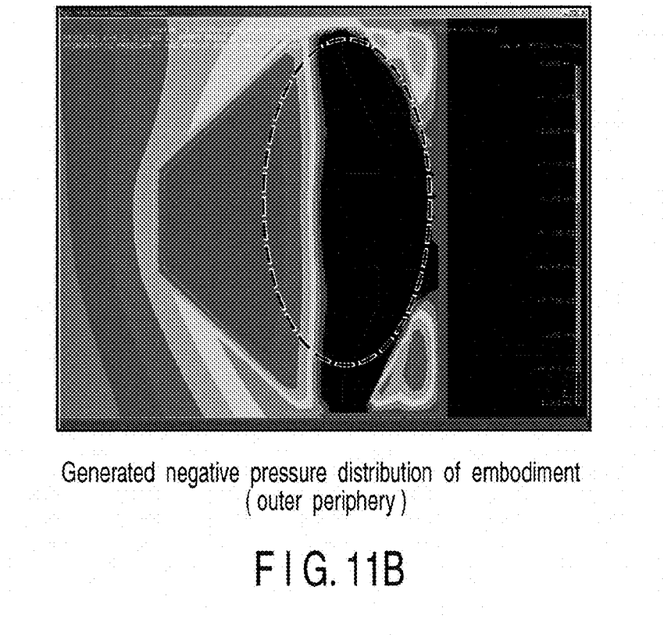

The inventor detected and compared generated pressure distributions on the respective disk-facing surfaces of the magnetic heads according to the present embodiment and the comparative example shown in FIG. 6. FIGS. 10A and 10B individually show generated positive pressure distributions near the respective trailing step portions of the magnetic heads according to the comparative example and the present embodiment at the inner peripheral portion of the magnetic disk. FIGS. 11A and 11B individually show generated negative pressure distributions near the respective trailing step portions of the magnetic heads according to the comparative example and the present embodiment at the outer peripheral portion of the magnetic disk.

As seen from these drawings, the magnetic head with the adjustment recess in the trailing step portion, compared with the comparative example, generates higher positive and negative pressures at the inner and outer peripheral portions, respectively, of the disk. Specifically, the adjustment recess can serve to control the positive and negative pressures as the peripheral speed changes. In consequence, the flying height of the magnetic head on the inner peripheral side of the disk where the peripheral speed is low can be made about 15% greater than on the outer peripheral side, as shown in FIG. 7.

Thus, there may be obtained the magnetic head of improved stability and reliability, of which the flying height on the inner peripheral side of the disk can be increased without unduly increasing that on the outer peripheral side, the head suspension assembly provided with the head, and the disk device.

While certain embodiments of the invention have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

The shapes, dimensions, etc., of the leading step portion, trailing step portion, and pads of the slider are not limited to the embodiment described herein but may be varied as required. Each adjustment recess formed in the trailing step portion is only expected to be shaped to define the first and second step portions extending across the first direction of the slider, and may be formed in any other shape than the trapezoid or rectangular one, e.g., a circular or elliptic shape.

Figure 12:
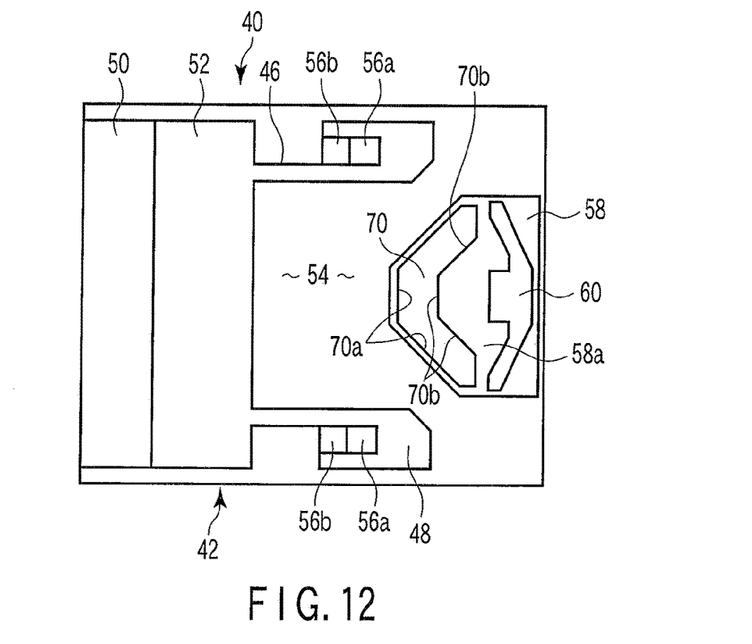
FIG. 12 is an exemplary plan view showing the disk-facing surface side of a magnetic head according to a second embodiment of the invention.

According to a second embodiment shown in FIG. 12, for example, an adjustment recess 70 is substantially V-shaped. A first step portion 70a that is defined by the adjustment recess 70 extends across the first direction X and along an upstream-side edge of a trailing step portion 58. A second step portion 70b that is defined by the recess 70 extends across the first direction X and substantially parallel to the first step portion 70a.

Figure 13:
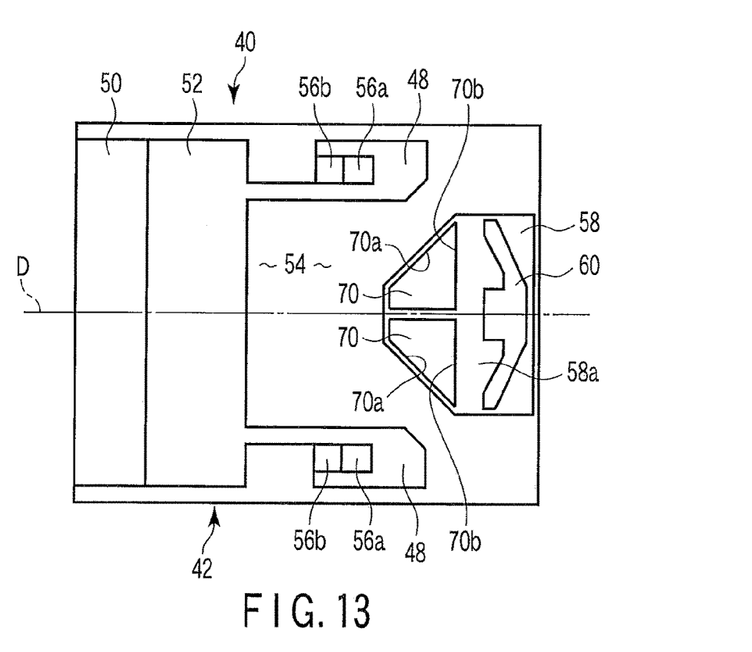
FIG. 13 is an exemplary plan view showing the disk-facing surface side of a magnetic head according to a third embodiment of the invention.

According to a third embodiment shown in FIG. 13, two adjustment recesses 70 are formed in a top surface 58a of a trailing step portion 58. The recesses 70 are formed each having a substantially triangular shape and arranged symmetrically with respect to a central axis D of a slider 42. Each adjustment recess 70 defines a first step portion 70a that extends across the first direction X and a second step portion 70b that extends along the second direction Y.

In the second and third embodiments, other configurations of each HDD are the same as those of the foregoing first embodiment, so that like reference numbers are used to designate like portions, and a detailed description thereof is omitted. Further, the same functions and effects of the first embodiment can also be obtained with the second and third embodiments.

In the present invention, moreover, the number of adjustment recesses is not limited to one, two, or three, but may be increased as required. In the first to third embodiments, furthermore, the adjustment recess or recesses are arranged or formed symmetrically with respect to the central axis D of the slider. Alternatively, however, the recess(es) may be arranged or formed asymmetrically with respect to the central axis D of the slider. In this case, the flying height profiles of the heads assemblies can be improved.

This invention is not limited to femto sliders but may also be applied to pico sliders, pemto sliders, or any other larger sliders.

What is claimed is:

1. A head assembly comprising:
a slider which has a facing surface opposed to a surface of a rotatable recording medium and is flown by an airflow which is generated between the recording medium surface and the facing surface as the recording medium rotates; and
a head portion which is disposed on the slider and records and reproduces information to and from the recording medium,
the facing surface of the slider having a first direction along the airflow and a second direction perpendicular to the first direction,
the slider including a negative-pressure cavity which is defined by a recess formed in the facing surface and generates a negative pressure, a leading step portion which protrudes from the facing surface and is situated on the upstream side of the negative-pressure cavity with respect to the airflow, a pair of sidestep portions which individually protrude from the facing surface, extend from the leading step portion toward a downstream end of the slider in the first direction, and are opposed to each other with a space therebetween in the second direction, a trailing step portion which protrudes from the facing surface, is situated on the downstream side of the negative-pressure cavity with respect to the airflow, and has a top surface opposed to the recording medium, a trailing pad which protrudes from the top surface of the trailing step portion, and an adjustment recess which is formed in the top surface of the trailing step portion on the upstream side of the trailing pad with respect to the airflow and is shallower than the negative-pressure cavity,
the adjustment recess forming a first step portion, which extends across the first direction and hangs from the top surface of the trailing step portion toward a bottom of the adjustment recess, and a second step portion, which extends across the first direction, is spaced in the first direction from the first step portion, and rises from the bottom of the adjustment recess toward the top surface of the trailing step portion.

2. The head assembly according to claim 1, wherein the adjustment recess has a closed contour and is situated within the top surface of the trailing step portion.

3. The head assembly according to claim 2, wherein the adjustment recess is defined by a flat bottom surface and a peripheral surface which rises substantially at right angles to the bottom surface and defines the first and second step portions.

4. The head assembly according to claim 1, wherein the first step portion includes a part extending in the second direction, and the second step portion includes a part extending in the second direction.

5. The head assembly according to claim 1, wherein the slider is provided with a plurality of adjustment recesses which are individually formed in the top surface of the trailing step portion on the upstream side of the trailing pad with respect to the airflow and are shallower than the negative-pressure cavity, each of the adjustment recesses defining the first and second step portions which extend across the first direction and are spaced in the first direction from each other.

6. A head suspension assembly used in a disk device which includes a disk recording medium and a drive section which supports and rotates the recording medium, the head suspension assembly comprising:
a head assembly including a slider, which has a facing surface opposed to a surface of the recording medium and is flown by an airflow which is generated between the recording medium surface and the facing surface as the recording medium rotates, and a head portion, which is disposed on the slider and records and reproduces information to and from the recording medium; and
a head suspension which supports the head for movement with respect to the recording medium and applies a head load directed toward the surface of the recording medium to the head, the facing surface of the slider having a first direction along the airflow and a second direction perpendicular to the first direction, the slider including a negative-pressure cavity which is defined by a recess formed in the facing surface and generates a negative pressure, a leading step portion which protrudes from the facing surface and is situated on the upstream side of the negative-pressure cavity with respect to the airflow, a pair of sidestep portions which individually protrude from the facing surface, extend from the leading step portion toward a downstream end of the slider in the first direction, and are opposed to each other with a space therebetween in the second direction, a trailing step portion which protrudes from the facing surface, is situated on the downstream side of the negative-pressure cavity with respect to the airflow, and has a top surface opposed to the recording medium, a trailing pad which protrudes from the top surface of the trailing step portion, and an adjustment recess which is formed in the top surface of the trailing step portion on the upstream side of the trailing pad with respect to the airflow and is shallower than the negative-pressure cavity, the adjustment recess forming a first step portion, which extends across the first direction and hangs from the top surface of the trailing step portion toward a bottom of the adjustment recess, and a second step portion, which extends across the first direction, is spaced in the first direction from the first step portion, and rises from the bottom of the adjustment recess toward the top surface of the trailing step portion.

7. A disk device comprising:

a disk recording medium;

a drive section which supports and rotates the recording medium;

a head assembly including a slider, which has a facing surface opposed to a surface of the recording medium and is flown by an airflow which is generated between the recording medium surface and the facing surface as the recording medium rotates, and a head portion, which is disposed on the slider and records and reproduces information to and from the recording medium; and a head suspension which supports the head for movement with respect to the recording medium and applies a head load directed toward the surface of the recording medium to the head, the facing surface of the slider having a first direction along the airflow and a second direction perpendicular to the first direction, the slider including a negative-pressure cavity which is defined by a recess formed in the facing surface and generates a negative pressure, a leading step portion which protrudes from the facing surface and is situated on the upstream side of the negative-pressure cavity with respect to the airflow, a pair of sidestep portions which individually protrude from the facing surface, extend from the leading step portion toward a downstream end of the slider in the first direction, and are opposed to each other with a space therebetween in the second direction, a trailing step portion which protrudes from the facing surface, is situated on the downstream side of the negative-pressure cavity with respect to the airflow, and has a top surface opposed to the recording medium, a trailing pad which protrudes from the top surface of the trailing step portion, and an adjustment recess which is formed in the top surface of the trailing step portion on the upstream side of the trailing pad with respect to the airflow and is shallower than the negative-pressure cavity, the adjustment recess forming a first step portion, which extends across the first direction and hangs from the top surface of the trailing step portion toward a bottom of the adjustment recess, and a second step portion, which extends across the first direction, is spaced in the first direction from the first step portion, and rises from the bottom of the adjustment recess toward the top surface of the trailing step portion.

* * * * *